United States Patent [19]

Pitts, Jr.

[11] 4,077,022

[45] Feb. 28, 1978

[54] WELL LOGGING METHOD AND MEANS USING AN ARMORED MULTICONDUCTOR COAXIAL CABLE

[75] Inventor: Robert W. Pitts, Jr., Houston, Tex.

[73] Assignee: Texaco Inc., New York, N.Y.

[21] Appl. No.: 630,242

[22] Filed: Nov. 10, 1975

Related U.S. Application Data

[62] Division of Ser. No. 494,578, Aug. 5, 1974, abandoned, which is a division of Ser. No. 427,156, Dec. 21, 1973, Pat. No. 3,855,468.

[51] Int. Cl.² .................. H01P 3/06; H03H 7/04; H01B 11/18; H04B 3/28
[52] U.S. Cl. .......................................... 333/1; 333/12; 333/79; 333/96
[58] Field of Search ............... 333/97 R, 1, 6, 8, 70 R, 333/79, 96, 12, 84 R; 324/1, 10, 11, 2; 174/32, 35 R, 34, 26, 28, 88 R, 88 C

[56] References Cited

U.S. PATENT DOCUMENTS

| | | | |
|---|---|---|---|
| 1,093,477 | 4/1914 | Rudenberg | 333/79 X |
| 1,856,204 | 5/1932 | Affel et al. | 333/96 X |
| 2,222,608 | 11/1940 | Elliot | 324/10 X |
| 2,243,851 | 6/1941 | Booth et al. | 333/1 X |
| 2,446,387 | 8/1948 | Peterson | 174/102 C X |
| 2,920,266 | 1/1960 | Owen | 324/10 X |
| 3,014,174 | 12/1961 | Charrin et al. | 324/10 X |
| 3,082,387 | 3/1963 | Monelli et al. | 333/96 X |
| 3,209,064 | 9/1965 | Cutler | 333/96 X |
| 3,324,417 | 6/1967 | Garner | 333/1 |
| 3,681,612 | 8/1972 | Vogl et al. | 333/79 X |

*Primary Examiner*—Alfred E. Smith
*Assistant Examiner*—Marvin Nussbaum
*Attorney, Agent, or Firm*—Thomas H. Whaley; Carl G. Ries; Ronald G. Gillespie

[57] ABSTRACT

A logging system employs an armored multiconductor coaxial cable, including an inner conductor, a shield and conductive outer armor and in which the shield, encompassing the inner conductor, comprises a plurality of conductors which includes groups of conductors, each group being separated from another group by an insulator. A distribution circuit has capacitors connected between each shield conductor to improve transmission of a high frequency signal by the inner conductor and the shield conductors while low frequency signals and direct current voltages may be transmitted by the shield conductors and the conductive armor of the cable.

A logging tool, including pulse neutron source, gamma ray detector and collar detector, is passed through a borehole traversing an earth formation. Data pulses corresponding in number and amplitude to detected gamma radiation are provided by the gamma ray detector to the inner conductor and to the plurality of conductors of the cable. The signal from the collar detector is applied to a first group of conductors of the plurality of conductors and the armor of the cable. Surface electronics adjacent to the borehole process data pulses received from the cable. A high voltage direct current power is provided to logging tool by way of the inner conductor and the armor of the cable. While second and third direct current voltages are applied to second and third groups of conductors, respectively, of the plurality of conductors and to the armor.

4 Claims, 4 Drawing Figures

4,077,022

WELL LOGGING METHOD AND MEANS USING AN ARMORED MULTICONDUCTOR COAXIAL CABLE

This is a division of application Ser. No. 494,578 filed Aug. 5, 1974, now abandoned, which in turn is a divisional application of Ser. No. 427,156, filed Dec. 21, 1973, now U.S. Pat. No. 3,855,468, issued Dec. 17, 1974.

BACKGROUND OF THE INVENTION

1. Field of the Invention

The present invention relates to cables in general and, more particularly, to electrical transmission cables.

2. Description of the Prior Art

Heretofore, commercial logging cables consisted of a plurality of conductors wrapped with armor where the armor may be used as the return path for signal conductor. However, such cables cannot be used for very high frequency signals since the armor offers a high skin effect resistance as a return path. Alternatively, an armored cable such as that described in U.S. application Ser. No. 192,883, filed Oct. 27, 1971, now U.S. Pat. No. 3,916,685 issued Nov. 4, 1975, assigned to Texaco Inc., assignee of the present invention, is cable of very high frequency signal transmission but may not be readily adaptable to commercial logging tools designed for multiconductor cables.

The present invention provides an armored multiconductor coaxial cable for both high frequency signal and low frequency signal transmission in which a plurality of conductors, comprising groups of conductors, form a shield for an inner conductor and are capacitively coupled so that each conductor group may carry a difference low frequency signal or a direct current voltage. The cable of the present invention is readily adaptable to commercial logging tools designed for multiconductor cables.

SUMMARY OF THE INVENTION

A well logging system includes a logging tool adapted to be passed through a borehole. Sensors in the logging tool senses conditions in the borehole. The sensors provide at least two signals corresponding to the sensed conditions. One signal may be a high frequency signal. The other signal or signals may have low frequencies or be direct current (zero frequency) signals. The system also includes surface electronics for processing the signals provided by the sensors. An armored multiconductor coaxial cable electrically connects the sonde to the surface electronics. The cable comprises an inner conductor, a plurality of conductors, including groups of conductors, and an outer conductive armor. The inner conductor is separated from the plurality of conductors by a first coaxial insulator. The plurality of conductors is separated from the outer coaxial armor by a second coaxial insulator. The conductor groups in the plurality of conductors are separated from each other by insulating material. A circuit in the tool applies the high frequency signal to the inner conductor and to the plurality of conductors while the circuit applies the low frequency signal to at least one conductor group of the plurality of conductors and to the armor for transmission to the surface electronics.

The objects and advantages of the invention will appear more fully hereinafter, from a consideration of the detailed description which follows, taken together with the accompanying drawings wherein one embodiment is illustrated by way of example. It is to be expressly understood, however, that the drawings are for illustrative purposes only and are not to be construed as defining the limits of the invention.

DESCRIPTION OF THE INVENTION

A conventional type well logging system may use an armored multiconductor coaxial cable having its conductors arranged in a manner which permits pulse signals requiring high quality signal transmission to be transmitted along with the transmission of other signals that do not require the quality of transmission. The cable has a plurality of conductors, including groups of conductors, which may be used for the low quality signal transmission, arranged around a center conductor which may be used for the high quality signal transmission, so that the plurality of conductors may be used as a shield for the inner conductor. High frequency signals may then be applied to the inner conductor using the plurality of conductors as the return path. The outer armor of the cable in turn is used as a shield and return path for signals having a substantial low frequency of direct current voltages.

Figure 1:
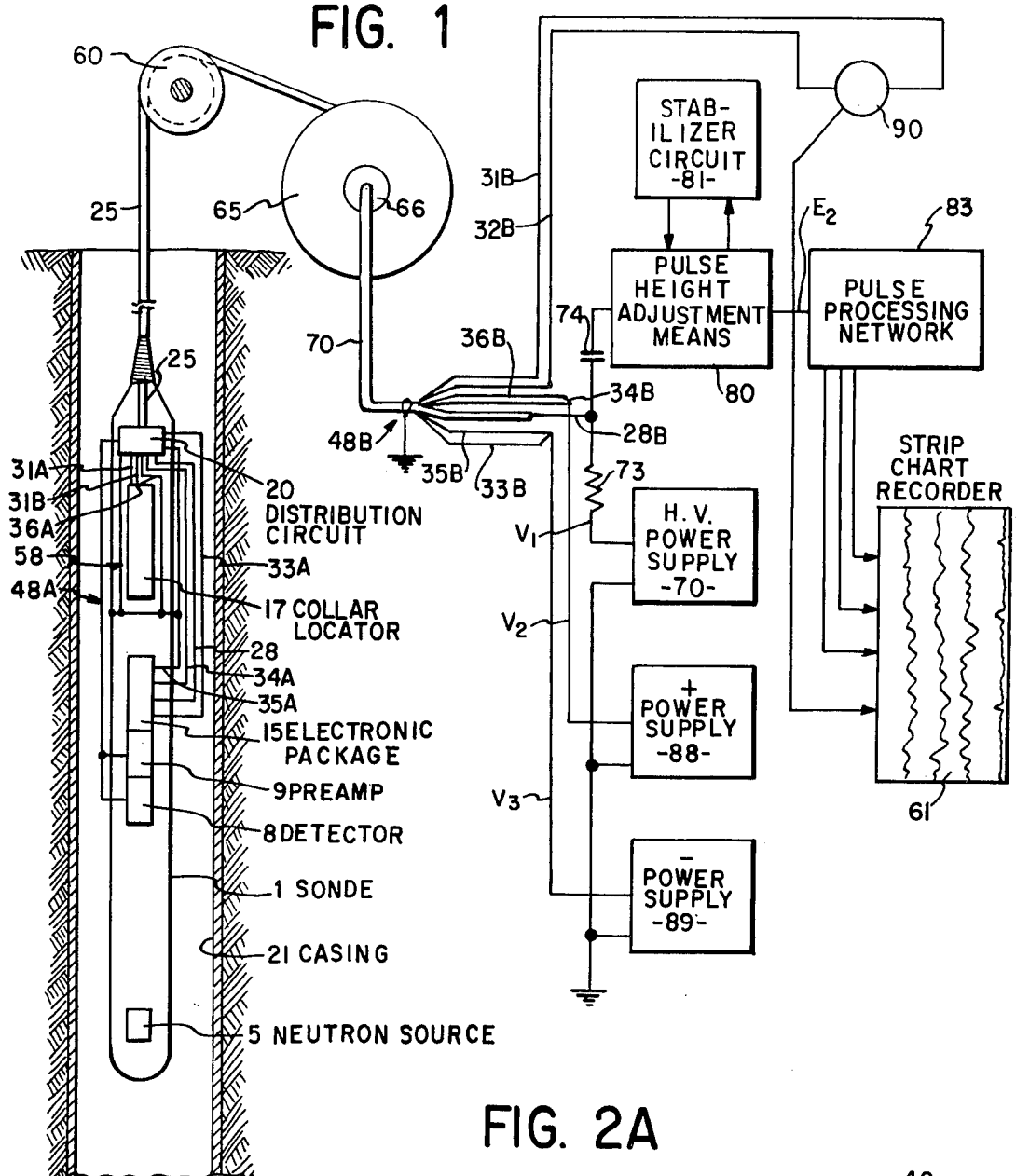
FIG. 1 is a simplified block diagram of a well logging system using an armored multiconductor coaxial cable constructed in accordance with the present invention.

Referring now to FIG. 1, a logging tool 1 is inserted in a borehole. Logging tool 1 may include a neutron source 5, crystal detector 8, a preamplifier 9, and an electronics package 15. Electronics package 15 is for the transmission of pulses uphole and may include a stabilizer pulse generator of the type described and disclosed in U.S. application Ser. No. 333,074, filed Feb. 16, 1973, now U.S. Pat. No. 3,855,538, issued Dec. 17, 1974, and assigned to Texaco Inc., assignee of the present invention, which provides reference pulses. Tool 1 also would include a conventional type collar locator 17 and may include a distribution circuit 20.

The operation of all the elements heretofore described with the exception of the distribution circuit 209 is well known in the art and would be repetitious at this point to describe in detail their operation. It is sufficient to say that neutron source 5 bombards the formation with neutrons which result in gamma rays being detected by crystal detector 8. Of course, it would be obvious to one skilled in the art that neutron source 5 may be omitted and to just detect natural gamma radiation. Preamp 9 amplifies a pulse signal from detector 8 corresponding to detected radiation. Electronics package 15 provides a pulse signal $E_1$ containing data pulses from preamp 9 and reference pulses for transmission to the surface. Collar locator 17 provides a signal every time a collar is passed in casing 21 in the borehole.

Figure 2A:
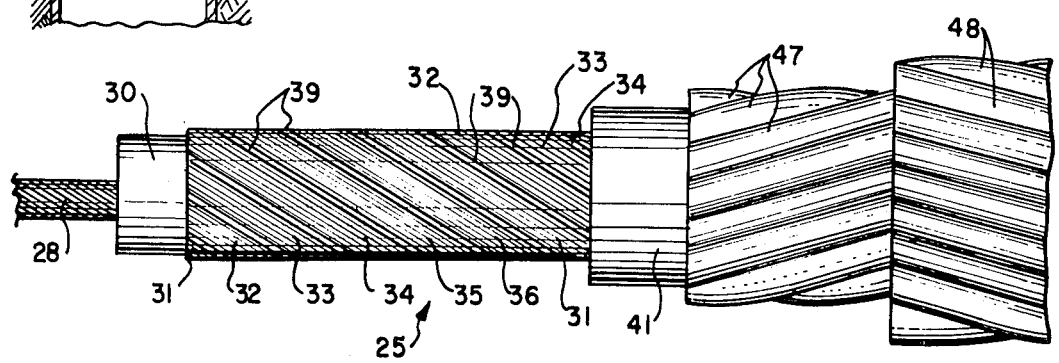
FIGS. 2A and 2B are diagrams of the cable shown in FIG. 1.
Figure 2B:
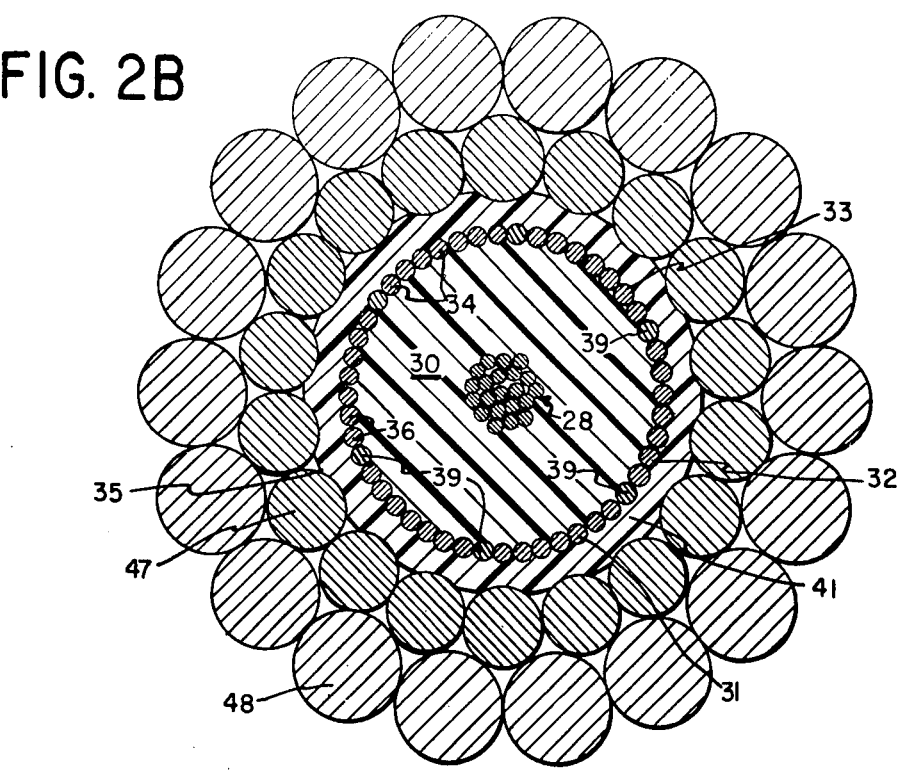

Referring now to FIGS. 2A and 2B, there is shown in detail an armored multiconductor coaxial cable 25. Cable 25 has an inner #16AWG conductor 28 comprising 19 twisted 0.0112 inch diameter tin copper wires surrounded by a coaxial insulator 30 which is made from insulative material such as Teflon. Wrapped around insulator 30 in a spiral fashion are six groups 31 through 36 of seven non-twisted conductors of 0.0112 tin copper wires. Separating groups 31-36 of conductors from each other are insulators 39 of 0.0112 inch diameter Teflon. One layer of armor 47 is composed of 18 strands of 0.043 inch galvanized steel wires, preformed right lay, and has a coating of anti-corrosion compound. Another layer of armor 48 is composed of 18 strands of 0.059 inch galvanized steel wires, preformed left lay, and has a coating of an anti-corrosion compound. Separating armor 47 from conductor groups 31 through 36 is another coaxial insulator 41 made from insulative material such as Teflon. It would be obvious to one skilled in the art that the number of conductors represented in this embodiment by conductor groups 31 through 36 may be increased or decreased or that other insulative and conductive materials may be used.

Figure 3:
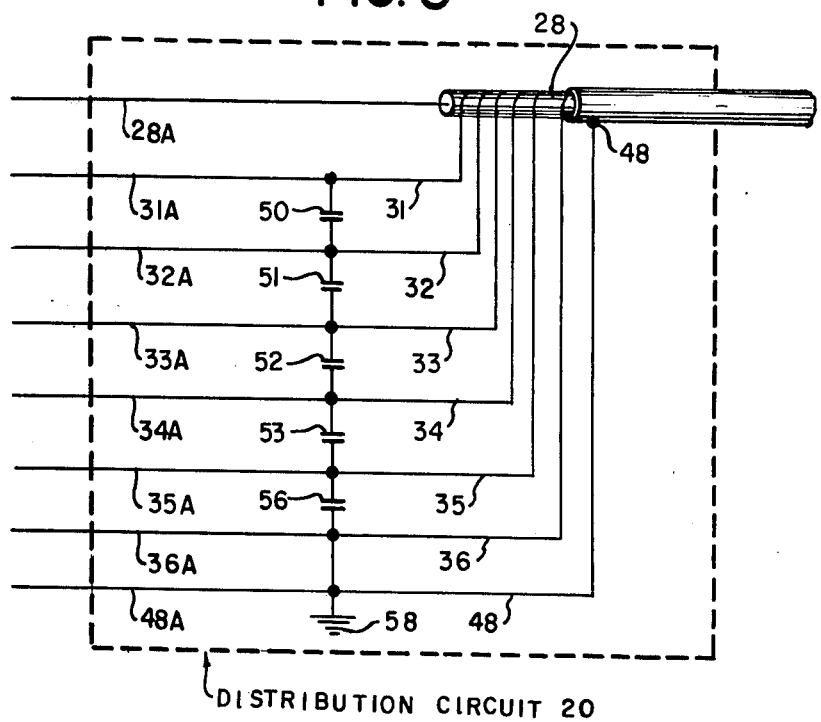
FIG. 3 is a schematic drawing of the distribution circuit shown in FIG. 1.

Referring again to FIGS. 1 and 3, distribution circuit 20 has a plurality of capacitors 50, 51, 52, 53 and 56 connected between conductors 31 and 32, 32 and 33, 33 and 34, 34 and 35, and 35 and 36, respectively, conductor groups 31 through 36 are effectively coupled together to form a shield; but for direct current signals, or low frequency alternating signals, conductor groups 31 through 36 are separate conductors. A capacitor 56 connects conductor 35 to ground 58 to effectively connect the alternating current shield to ground. Armor 48 is connected to ground 58. The capacitors of distribution circuit 20 improve the high frequency coupling between groups in conductor groups 31–36 and ground 58.

Conductors 31A, 32A, connected to collar locator 17, are connected to conductor groups 31 and 32, of cable 25, respectively, for transmission of the collar detector signals to surface electronics. Conductors 33A and 34A are connected to conductor groups 33 and 34, respectively, to provide a high and low direct current voltage to crystal detector 8. Conductor groups 35 and 36 are connected to ground 58, since they are not needed in the present system but available for use in other systems using cable 25. Conductor 28 is used with the high frequency characteristics of the shield to transmit high frequency data signals to the surface electronics.

Cable 25 passes over a wheel type measuring device 60 which provides a signal to strip chart recorder 61, corresponding to the depth of penetration of logging tool 1 in the borehole. Cable 25 is wound on a drum 65 and is connected to commutator rings 66. Commutator rings 66 are connected to another cable 70 which may be of the same type as cable 25, although it is not necessary that it be so. However, if cable 70 is not the same type as cable 25, then provisions must be made for utilizing of a conductor to provide for a downhole ground connection.

A conductor 28B of cable 70 is connected to a resistor 73 and a capacitor 74. A high voltage power supply provides the direct current voltage $V_1$ to conductor 28B through resistor 73.

Pulse signal $E_1$ passes through capacitor 74 and is applied to pulse height adjusting means 80. Means 80 provides a signal to a spectrum stabilizer 81. Stabilizer 81 controls means 80 with a control signal to adjust the amplitude of the pulses $E_2$ being provided by means 80 in accordance with the reference pulses in pulse signal $E_1$. Means 80 is described in detail in the aforementioned U.S. application Ser. No. 192,883 and includes elements 50, 53, 55, 58, 61, 66 and 67, disclosed in that application. Stabilizer 62 receives a reference voltage $V_4$ and compares the reference pulses with reference voltage $V_4$ to provide the control signal to adjusting means 80. Stabilizer 81 may be of a type NC 20 manufactured by the Harshaw Chemical Co.

Pulses $E_2$ from adjusting means 80 are applied to a pulse processing network 83 which may be of the type described in the aforementioned U.S. application Ser. No. 192,883.

A low voltage power supply 88 provides a positive direct current voltage $V_2$ to conductor 34B. Another low voltage power supply 89 provides a negative direct current voltage $V_3$ to conductor 33B.

A collar locator meter 90 is connected between conductors 31B and 32B and the output of pulse processing network 83 and collar locator meter 90 are applied to a strip chart recorder 61 for recording that information.

The present invention as heretofore described is a nuclear well logging system which generates a high frequency signal and at least one low frequency signal downhole. The system includes an armored multiconductor coaxial cable having an inner conductor, a plurality of conductors, including groups of conductors, and an outer conductive armor. A distribution circuit improves coupling between the conductor groups of the plurality of conductors for high frequency signals and decoupling between the groups of conductors for low frequency signals or direct current signals. The conductor groups when so coupled may be used as a shield for the inner conductor when a high frequency signal is applied to the inner conductor and to the groups of conductors. Low frequency signals and direct current signals may then be applied individually to corresponding conductor groups of the plurality of conductors and to the outer armor of the cable.

What is claimed is:

1. A shieldless cable comprising first means for conducting a high frequency signal; second means spatially arranged with said first means in a predetermined manner for a return path for the high frequency signal while conducting different low frequency or direct current signals, said second means including groups of conductors arranged in a predetermined relationship to said first means, means separating the groups of conductors for insulating each conductor group from any other conductor group, and means for passing the high frequency signal and for blocking the low frequency or direct current signals, so as to effectively couple the groups of conductors with each other for the high frequency signal and to decouple the groups of conductors from each other for the low frequency or direct current signals; and third means spatially arranged with said second means for providing protection to the first and second means and a return path for the low frequency or direct current signals.

2. A cable as described in claim 1 in which the coupling/decoupling means are capacitors.

3. A cable as described in claim 2 in which the third means includes a second coaxial insulator, and an outer armor of conductive material separated from said groups of conductors by said second coaxial insulator.

4. A cable as described in claim 1 in which the first means is an inner conductor, and a first coaxial insulator which separates said inner conductor from said groups of conductors.

* * * * *